(12) United States Patent
Zwingmann et al.

(10) Patent No.: US 11,396,138 B2
(45) Date of Patent: Jul. 26, 2022

(54) TRACTION ELEMENT MADE OF FIBER REINFORCED PLASTIC

(71) Applicant: Technische Universitat Berlin, Berlin (DE)

(72) Inventors: Bernd Zwingmann, Berlin (DE); Yue Liu, Berlin (DE); Mike Schlaich, Berlin (DE)

(73) Assignee: TECHNISCHE UNIVERSITAT BERLIN, Berlin (DE)

( * ) Notice: Subject to any disclaimer, the term of this patent is extended or adjusted under 35 U.S.C. 154(b) by 816 days.

(21) Appl. No.: 15/291,372

(22) Filed: Oct. 12, 2016

(65) Prior Publication Data

US 2017/0113403 A1    Apr. 27, 2017

(30) Foreign Application Priority Data

Oct. 21, 2015  (DE) .......................... 102015220581.9

(51) Int. Cl.
*B29C 65/00* (2006.01)
*E04C 5/07* (2006.01)
(Continued)

(52) U.S. Cl.
CPC .............. *B29C 66/69* (2013.01); *B29C 53/02* (2013.01); *B29C 65/48* (2013.01);
(Continued)

(58) Field of Classification Search
CPC ......... B29C 53/02; B29C 65/48; B29C 66/69; B29C 66/7212; B29C 70/347;
(Continued)

(56) References Cited

U.S. PATENT DOCUMENTS 2,406,270 A * 8/1946 Torell ..................... D07B 1/185
57/202
3,111,569 A * 11/1963 Rubenstein ......... B28B 23/0006
52/223.14
(Continued)

FOREIGN PATENT DOCUMENTS

DE    202008008215 U1   10/2008
DE    102013007284 A1   10/2014
(Continued)

*Primary Examiner* — Holly Rickman
*Assistant Examiner* — Lisa Chau
(74) *Attorney, Agent, or Firm* — Ware, Fressola, Maguire & Barber LLP

(57) ABSTRACT

A tension member with at least one loop made from fiber-reinforced plastic, which tension member has a plurality of fibers that run substantially parallel to each other, so that the loop is formed by the plurality of fibers, wherein a first group of fibers is turned over along the loop in a first turning direction, while a second group of fibers is turned over along the loop in a second turning direction, which is opposed to the first turning direction. Some of the turned-over fibers of both groups end in a different distance from the vertex of the loop than others of the turned-over fibers, so that a cross-section of the tension member that results from the respective number of fibers that run approximately parallel to each other outside the turning-over area of the fibers approximately continuously decreases until it reaches the cross-section size of the tension member.

9 Claims, 5 Drawing Sheets

(51) Int. Cl.
  *B29C 70/86* (2006.01)
  *B29C 70/34* (2006.01)
  *B29C 53/02* (2006.01)
  *B29C 65/48* (2006.01)
  *E01D 19/00* (2006.01)
  *B29K 63/00* (2006.01)
  *B29K 307/04* (2006.01)
  *B29L 31/06* (2006.01)

(52) U.S. Cl.
  CPC ........ *B29C 66/7212* (2013.01); *B29C 70/347* (2013.01); *B29C 70/86* (2013.01); *E01D 19/00* (2013.01); *E04C 5/073* (2013.01); *B29K 2063/00* (2013.01); *B29K 2307/04* (2013.01); *B29L 2031/06* (2013.01)

(58) Field of Classification Search
  CPC ................ B29C 70/86; B29K 2063/00; B29K 2307/04; E04C 5/073; B29L 2031/06
  See application file for complete search history.

(56) References Cited

U.S. PATENT DOCUMENTS

| | | | |
|---|---|---|---|
| 4,255,087 A * | 3/1981 | Wackerle | B64C 27/46 416/134 A |
| 4,603,084 A | 7/1986 | Drachenberg et al. | |
| 4,715,589 A * | 12/1987 | Woemdle | B66C 1/18 267/148 |
| 4,886,254 A | 12/1989 | Carpentier et al. | |

FOREIGN PATENT DOCUMENTS

| | | |
|---|---|---|
| EP | 0143163 A1 | 6/1985 |
| EP | 0 143 163 B1 | 11/1986 |
| EP | 0815329 A1 | 1/1998 |
| EP | 0 815 329 B1 | 1/2003 |
| EP | 2829661 A1 | 1/2015 |

\* cited by examiner

TRACTION ELEMENT MADE OF FIBER REINFORCED PLASTIC

CROSS REFERENCE TO RELATED APPLICATION

This application claims priority under 35 USC § 119 to German Patent Application No. 102015220581.9 which was filed on Oct. 21, 2015. This application is hereby incorporated by reference in its entirety.

TECHNICAL FIELD

The invention relates to a tension member having a loop made of fiber-reinforced plastic which serves as anchorage for the tension member, a support structure made of fiber-reinforced plastic and a method for manufacturing a tension member with a loop.

BACKGROUND OF THE INVENTION

A fiber-reinforced plastic here means a material consisting of continuous fibers embedded in a plastic matrix. The term continuous fibers typically refers to fibers having a fiber length that exceeds 50 mm. The continuous fibers can for example be glass fibers, aramid fibers, basalt fibers or preferably carbon fibers. The plastic matrix can be formed for example from a thermoplastic or a thermosetting plastic.

Carbon fibers display a high tensile strength along with a high rigidity while simultaneously having a low mass. That is why carbon fibers are often significant for those industrial applications, where these characteristics are required, despite the comparatively high material costs. Usually, carbon fibers are further processed into carbon fiber reinforced plastic manually or automatically using pultrusion systems or winding machines. Carbon fiber reinforced plastic is a composite material consisting of carbon fibers that are embedded in a plastic matrix. Carbon fiber-reinforced plastic is a light, high-strength material that is largely resistant against aggressive media, corrosion and fatigue.

Due to their high strength in fiber direction, carbon fiber reinforced plastics are especially suitable for bar-shaped tension members. A special challenge hereby is the anchoring of the carbon fibers that would be suitable for the material. Through the anchorage, the fibers at the anchoring point are often weakened or exposed to additional strain, so that a corresponding cross-section of the fibers experiences early failure prior to reaching its actual bearing capacity.

EP 0 815 329 B1 describes an anchorage element and/or tension member in the form of a loop which is manufactured from a fiber-reinforced plastic. The loop-shaped element there consists of a plurality of loop layers and/or band layers and/or layers lying on top of each other, whereby these are formed by one single band, which is multiply looped over itself, and whereby the two ends of the band are connected in each case to the directly adjacent loop or band layer or resting loosely against the latter.

EP 0 143 163 B1 deals with a tension member consisting of a bolt and a loop that is turned over this bolt and that consists of unidirectional bundles of fibers in a plastic matrix. In the region where the loop is turned over the bolt, the loop is provided with fiber cover layers and/or fiber inserts bound by the plastic matrix, which in each case have at least a principal fiber orientation in the direction, in which the bolt extends.

SUMMARY OF THE INVENTION

The objective of the present invention is to provide an improved tension member made of fiber-reinforced plastic by changing the manufacturing method and increasing the bearing capacity of the loop.

For this purpose, in accordance with a first aspect of the invention, a tension member with at least one loop made of a fiber-reinforced plastic is disclosed, which has a plurality of fibers that run substantially parallel to each other. The loop is formed by the plurality of fibers, wherein a first group of fibers is turned over along the loop in a first turning direction, whereas a second group of fibers is turned over along the loop in a second turning direction which is opposed to the first turning direction. Moreover, some of the turned-over fibers of both groups end in a different distance from the vertex of the loop than others of the turned-over fibers, so that a cross section of the tension member that results from the respective number of fibers that run approximately parallel to each other outside the turning-over area of the fibers approximately continuously decreases until it reaches the cross-section size of the tension member.

The loop of the tension member according to the invention is particularly designed to form, e.g. with a bolt or similar, a loop anchorage for anchoring the tension member.

One advantage of the tension member according to the first aspect of the invention is the fact that such a tension member can be formed from fibers with any desired length, as the loop is formed only locally at the end of the fibers. This makes many different applications for the tension member with respectively different dimensions possible, like for example as an individually designed component, or as part of a support structure for building structures such as buildings, bridges, tunnels, sports facilities, towers, tents, or also for mobile machines such as cranes, ships, wind turbines.

A further advantage of the tension member according to the invention lies in the fact that a failure of the tension member at the anchorage point with applied traction force can be avoided. This is realized due to the fact that the cross-section of the tension member is additionally reinforced in the area of the loop in the way described above. Moreover, as the cross-section of the tension member in the area of the loop is bigger than in an unbent area of the tension member, where no fibers are turned over, a failure of the tension member under a respective traction force in the area of the loop can be avoided, whereas it becomes probable in the unbent area of the tension member, so that the unbent (straight) area of the tension member is decisive with respect to a dimensioning of the tension member.

A further benefit of the tension member according to the invention lies in the fact that already manufactured bar-shaped profiles of fiber-reinforced plastic with any desired cross-section can be used for forming the tension member by arranging said profiles parallel to each other. By unraveling and/or fanning out and turning over of the profiles, the loops and thus a tension member according to the invention are formed.

In the following, preferred embodiment variants of the tension member according to the invention are described.

According to one preferred embodiment variant of the tension member, the first group of fibers comprises a number of fibers that differs from a number of fibers of the second group of fibers by maximum 20 percent, i.e. approximately the same amount of fibers are turned over in the first turning direction as in the second turning direction. This results in the tension member of this embodiment example having a continuous and, in addition to that, symmetrical decrease of the cross-section outside of the loop, which can contribute to a better bearing capacity of the tension member.

According to a further embodiment variant, the fibers of the two groups alternate, so that a few fibers from the first group are always followed by a few fibers from the second group and vice versa, which are turned over according to their respective turning direction. The tension member according to this variant increases the contact surface between the fibers in the area of the loop in an advantageous way, so that the tensile strength of the ending fibers can be transferred.

According to a further embodiment variant, the ends of the turned-over fibers are firmly bonded with the tension member. Preferably, the ends are embedded between the fibers. Such a firm bond in a variant of this embodiment example is realized by temporarily raising the temperature, by prompting a chemical reaction or by injecting a plastic. The temporary raising of the temperature can for example be achieved within the framework of a hot-pressing process using a thermoplastic matrix, whereby in this case, during such a thermal treatment, it can be advantageous to apply additional side-pressure onto the fibers in the area of the turned-over fiber ends. In case of a thermoplastic matrix, through the hardening of the fiber-reinforced plastic, a bond is realized between the ends of the turned-over fibers and the plastic matrix, into which the fibers are embedded within the fiber-reinforced plastic. In case of a thermosetting plastic, like e.g. epoxy resin or polyester resin, a bond results from setting of the matrix. The strength of the matrix can be increased and/or the setting accelerated through a thermal treatment like annealing.

The area, where the fiber ends and/or the fiber profile ends are arranged within the tension member, forms an overlap area. In one embodiment variant of the tension member, the turned-over fibers or fiber profiles are firmly bonded with the tension member over the whole overlap area. Such an inter-connection over a large area can be achieved by using an adhesive. Such an extensive firm bonding of this embodiment variant provides the advantage of the fact that a shear load within the contact surfaces between the individual fibers or fiber profiles is low.

Additionally or alternatively, the ends of the turned-over fibers can be connected to the tension member via a frictional connection. Preferably, the ends are embedded between the fibers. In one variant, this is achieved by applying a side-pressure e.g. by installing a clamp or a clip. In a further variant, the ends of the turned-over fibers are connected to the tension member via a firm bond and a friction lock, which can additionally enhance the bearing capacity of the connection.

For the tension member, according to the first aspect of the invention, the substantially parallel fibers do not have to be entirely agglutinated or bonded to each other, but can be entirely or partly separated from each other or have a shear-resisting bond only in sections along the tension member.

In a further embodiment variant of the tension member, the fibers form a plurality of fiber layers arranged on top of each other, whereby the fibers of the respective fiber layer are each part of the same group of fibers, and whereby adjacent fiber layers each have fibers that are part of different groups, i.e. the fiber layers are each alternately turned over in opposed turning directions. Turning over the fibers in layers, as described in this embodiment variant, facilitates an industrial manufacturing of the tension member according to the invention.

Preferably, the tension member comprises an elongated shaft section made of fiber-reinforced plastic, having at least one loop on each end of the elongated section. In a particularly preferred embodiment variant, the shaft section is pliable. Through the loop, tractive forces can be introduced into the tension member in a reliable manner, which enables it to be used in a support structure or in machines.

According to a second aspect, the invention relates to a support structure, which comprises a plurality of tension members according to the first aspect of the invention, whereby each of the tension members, as described in the last embodiment example, are formed from a substantially straight stretched shaft section, which is provided with a loop as on a first end as well as on a second end each.

Thus, the support structure according to the second aspect of the invention leads to the same advantages as the tension member according to the first aspect of the invention. The support structure can in particular be used everywhere, where a high tensile strength along the respective fiber direction of the fibers is desirable. Such applications of the support structure are found in buildings, bridges, tunnels, sports facilities, towers as well as in cranes, ships, wind turbines or similar.

According to a third aspect, the invention relates to a method for manufacturing of a tension member from a fiber-reinforced plastic with a loop. The production of the loop comprises the following steps:

providing a plurality of fibers of the tension member, which fibers run substantially parallel to each other and have a respective fiber end, e.g. in the form of profiles from parallel running fibers arranged in parallel to each other;

turning a plurality of fiber ends of the fibers over in a first turning direction along the loop that is to be manufactured;

turning over a further plurality of fiber ends of fibers in a second turning direction, which is opposed to the first turning direction;

repeating the first steps mentioned above, until all fibers of the plurality of fibers have been turned over, whereby the turning-over occurs such that some of the turned-over fibers end in a different distance from the vertex of the loop than others of the turned-over fibers, so that a cross-section of the tension member that results from the respective number of fibers that run approximately parallel to each other outside the turning-over area of the fibers approximately continuously decreases until it reaches the cross-section size of the tension member.

The advantageous feature of this method is the fact that elaborate systems for manufacturing the loop at the tension member are not necessarily required. Thus, it is possible for the loop to be manufactured directly at the further application location of the tension member. The turning over can thus be performed around a counter part of the tension member, which in the respective subsequent application will form an anchorage for the tension member.

In the following, embodiment variants of the method according to the invention are described.

According to one embodiment variant of the method, the turning over of the fiber ends is performed around a turning element with dimensions that would prevent a falling below a minimum turning-over radius of the fibers. Thus, by using a turning element, it is ensured that the fibers are not damaged and, in particular, not broken.

The number of fiber ends of the fibers to be respectively turned over is selected in a preferred embodiment variant such that after turning-over of all fibers, the number of fibers turned over in the respective turning direction differs from the number of fibers turned over in the opposite turning direction by maximum 20 percent.

According to a further embodiment variant, the turning-over of the fiber ends is performed such that some fibers are alternately turned over in accordance with the first turning direction and in accordance with the second turning direction, so that between 2 and several hundred turning-over steps are performed. In a sub-variant of this embodiment variant, during every turning-over step, fiber ends from a pre-determined area of the cross-section of the tension member are automatically turned over, so that the number of the turning-over steps is also pre-determined and independent from a total number of the plurality of fibers in the tension member.

Additionally, the method can include a firm bonding of the fiber ends of the turned-over fibers with the tension member. This can happen by increasing the temperature at the fiber ends, by triggering a chemical reaction of the coating or by injecting a plastic. In a further variant, the turned-over fibers are firmly bonded across an entire overlap area, which is defined by the area of overlap between the fiber ends and the tension member. This can happen, for example, by increasing the temperature in the overlap area, so that the plastic that is surrounding the fibers is solidified.

Alternatively or in addition to this, the turned-over fibers can also be connected to the tension member in a firmly bonded or frictional way, e.g. by using a clamp or a similar element.

According to a further configuration variant, the ends of the turned-over fibers are finally connected to the tension member via a frictional connection. Such a frictional connection can be achieved by installing a clamp or a clip. Furthermore, it is also possible to connect the fiber ends with the tension member via a firmly bonded connection as well as a frictional connection.

For a method according to the invention in accordance with the third aspect of the invention, the substantially parallel fibers do not have to be entirely agglutinated or bonded to each other, but can be entirely or partly separated from each other or have a shear-resisting bond only in sections along the tension member.

Preferably, the fibers of the tension member to be manufactured are first aligned parallel to each other. This can be performed via manufacturing of a prepreg material via a prepreg system. In such prepreg materials, the fibers are typically aligned substantially parallel to each other and are further processed into profiles in a second step, either manually or on a laminating machine. In a further variant, a pultrusion system or a winding machine are used for providing a substantially parallel arrangement of the plurality of fibers e.g. in the form of profiles made of fiber-reinforced plastic.

For the subsequent manufacture of the loop, it is particularly advantageous for the fiber ends not yet to be embedded in the plastic matrix of the rest of the tension member, as loose fibers provide the largest potential contact surface during further processing into a loop. The same applies to profiles with a high surface/cross-section ratio.

Moreover, the method can comprise applying a coating or arranging additional fibers on an outer circumferential surface of the plurality of fibers. This provides the advantage that through this method the tension member manufactured is better protected from outer influences such as aggressive media or mechanical stresses than a tension member without additional coating or additional fibers. Further advantages of a possible utilization of the coating is bundling the fibers and/or profiles into a single thread or connecting the fiber ends with the tension member.

The tension member as described above may also have a substantially straight stretched and dividing shaft section that has a loop on at least one end.

The tension member as described above, which has a substantially straight stretched shaft section that, on one side or on both sides, divides into several cords and has a loop on each end.

BRIEF DESCRIPTION OF THE DRAWINGS

The invention will now be further explained using embodiment examples with relation to the figures. The figures show:

FIG. 2*a* illustrates a first phase with a turned-over number of carbon fibers, FIG. 2*b* shows a second phase with a second turned-over number of carbon fibers and FIG. 2*c* shows a third phase with a third turned-over number of carbon fibers;

DETAILED DESCRIPTION

In the following, tension members made of carbon fibers are described in the embodiment examples. Alternatively or additionally, respective embodiment examples of a tension member can also have glass fibers, aramid fibers, basalt fibers or other technical or natural fibers used as fibers of the fiber-reinforced plastic. Or a mixture of different fibers, e.g. aramid fibers and carbon fibers, can also be provided.

Figure 1:
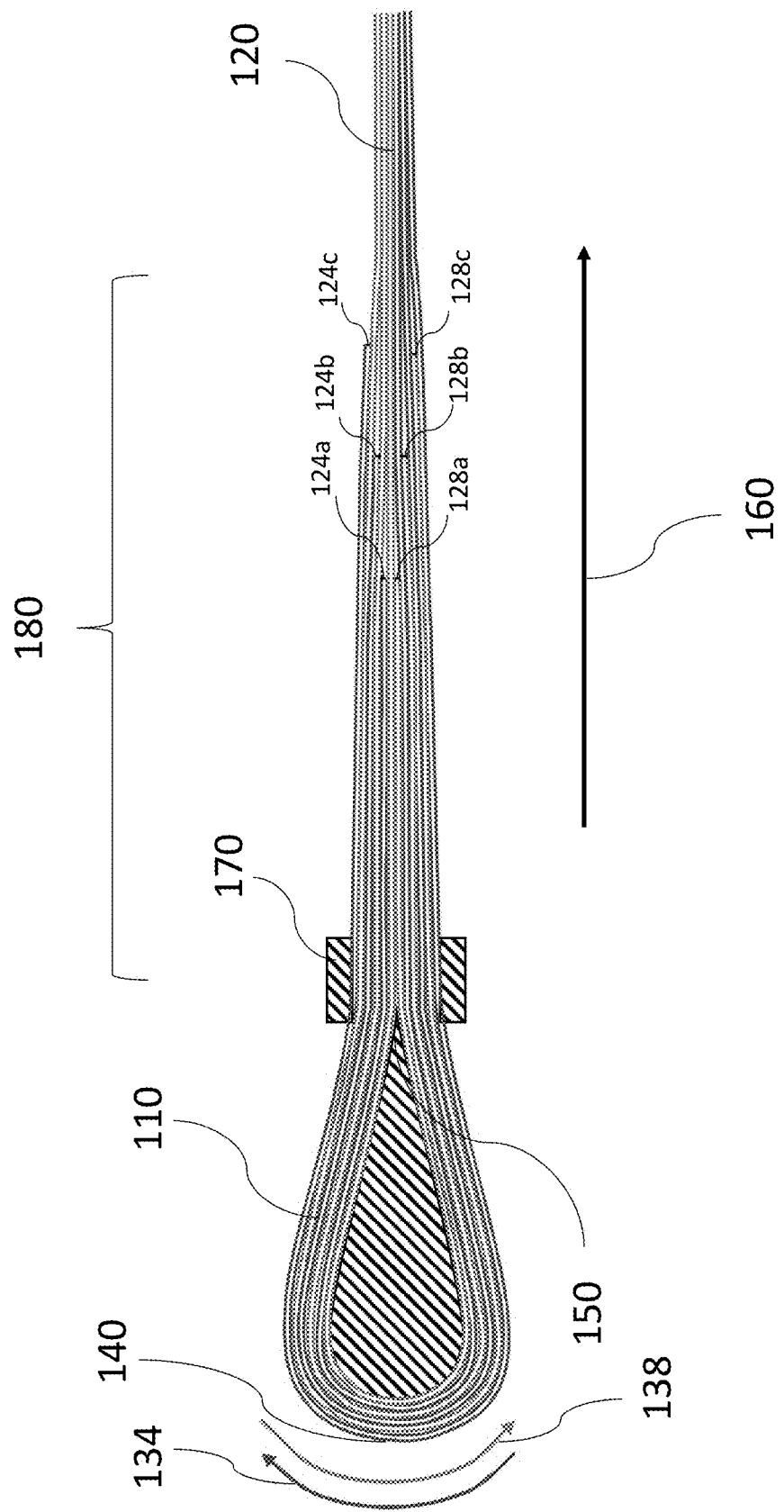
FIG. 1 a representation of an embodiment example of a tension member made of carbon fiber reinforced plastic with a loop according to a first aspect of the invention.

FIG. 1 shows a representation of an end of an embodiment example of a tension member 100 with a loop 110 according to a first aspect of the invention. In the embodiment example, the tension member 100 is manufactured from carbon fiber reinforced plastic.

The tension member 100 comprises a plurality of carbon fibers 120 running substantially parallel to each other. The loop 110 is formed by the plurality of the carbon fibers 120. In this case, a first group of carbon fibers 124*a*, 124*b*, 124*c* from the plurality of carbon fibers 120 is turned over along the loop 110 in a first turning direction 134, while a second group of carbon fibers 128*a*, 128*b*, 128*c* from the plurality of carbon fibers 120 is turned over along the loop 110 in a second turning direction 138, which is opposite to the first turning direction. Moreover, FIG. 1 illustrates the fact that the turned-over fibers of both groups 124*a*, 124*b*, 124*c*, 128*a*, 128*b*, 128*c* end in a different distance from the vertex 140 of the loop 110 than other turned-over fibers. This results in the fact that a cross-section of the tension member 100, which results from a respective number of carbon fibers 120 running approximately parallel to each other, starting from the base 150 of the loop 110 and outside the turning-over area of the fibers, approximately continually decreases until it reaches the cross-section size of the tension member.

Furthermore, in the represented embodiment example, the first group of carbon fibers 124a, 124b, 124c is substantially equal in size to the second group of carbon fibers 128a, 128b, 128c. The carbon fibers from the first group 124a, 124b, 124c and the carbon fibers from the second group 128a, 128b, 128c alternate respectively, which leads in this embodiment to an advantageously high contact surface between the carbon fibers, when a tensile force is applied in the pulling direction 160.

For the tension member 100, a clamp 170 is used, which clamp exerts a side pressure unto the tension member 100, in order to unite and frictionally fasten the ends of the turned-over carbon fibers 124a, 124b, 124c, 128a, 128b, 128c between the carbon fibers 120 of the plurality of the carbon fibers around the two cords of the loop. Here, the fastening via the clamp 170 happens only in the area of the base 150 of the loop 110. The area in which the carbon fibers 124a, 124b, 124c, 128a, 128b, 128c are arranged between the carbon fibers 120, forms an overlap area 180. In addition to the friction lock, the ends of the carbon fibers 124a, 124b, 124c 128a, 128b, 128c are glued together over the entire overlap area 180. In the represented embodiment example, on the one hand, the clamp 170 serves the purpose of increasing the bearing capacity of the adhesive bond, and on the other hand, of absorbing transverse forces, which without the clamp would divide the petering-out carbon fibers into two cords.

The clamp can also stretch over a larger area or over the entire overlap area.

The ends of the turned-over carbon fibers can be connected to the plurality of carbon fibers via a chemical reaction, e.g. by curing of an adhesive, or via heating the plastic matrix that surrounds the carbon fibers over the entire overlap area.

Figure 2A:
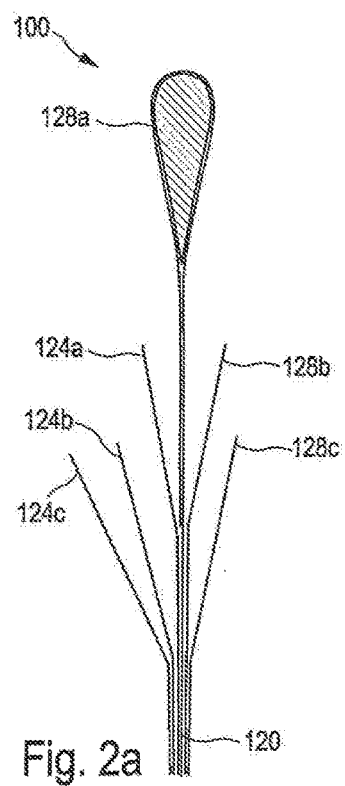
FIG. 2*a*-2*c* each showing a representation of different manufacturing phases of an embodiment example of the tension member according to the first aspect of the invention, whereby
Figure 2B:
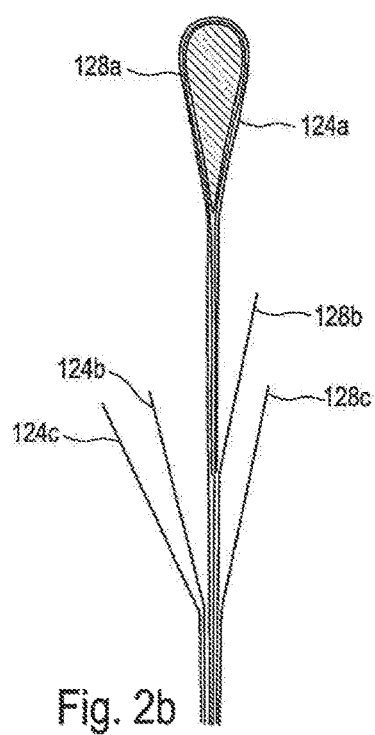
Figure 2C:
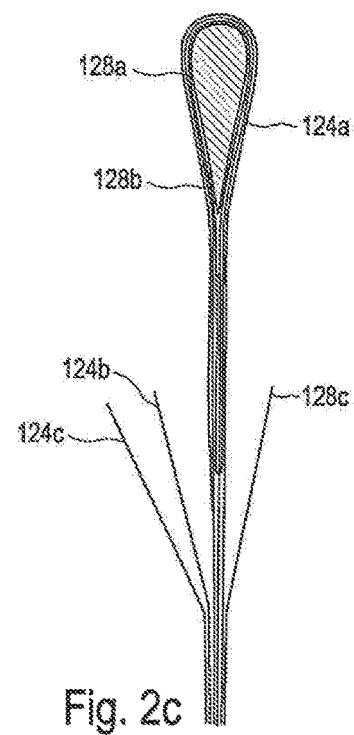

FIGS. 2a to 2c each show different phases of the manufacturing method of an embodiment example of the tension member 100 according to the first aspect of the invention.

FIG. 2a illustrates a first phase of manufacture with individual turned-over carbon fibers 128a and a plurality of frayed and/or fanned out and not turned over fiber ends 124a, 124b, 124c, 128b, 128c, which extend from the plurality of the carbon fibers 120. Here, the carbon fibers 124a, 124b, 124c, 128a, 128b, 128c each are a number of carbon fibers, which form a bundle of carbon fibers each. In an embodiment that is not shown, individual fibers or fiber profiles are turned over in accordance with FIG. 1 and FIGS. 2a to 2c.

FIG. 2b shows a second phase of manufacture with two turned-over bundles of carbon fibers 124a, 128a. The second turned-over carbon fiber bundle 124a was laid over the first turned-over carbon fiber bundle 128a, so that the latter determines a form of the loop.

FIG. 2c shows a third phase with three turned-over carbon fiber bundles 124a, 128a, 124b, whereby the third turned-over carbon fiber bundle 128b is turned over around the second turned-over carbon fiber bundle 124a. Thus, the first turned over carbon fibers 128a further determine the inner form of the loop.

It is immediately recognizable that by repeated turning over of the not yet turned-over fiber ends, a tension member 100 according to the first aspect of the invention is formed.

Moreover, the three phases, which are illustrated in the FIGS. 2a to 2c, show the different steps of a method for manufacturing a tension member 100 according to the third aspect of the invention. This method will be further explained in the context of the block diagram shown in FIG. 4.

Figure 3:
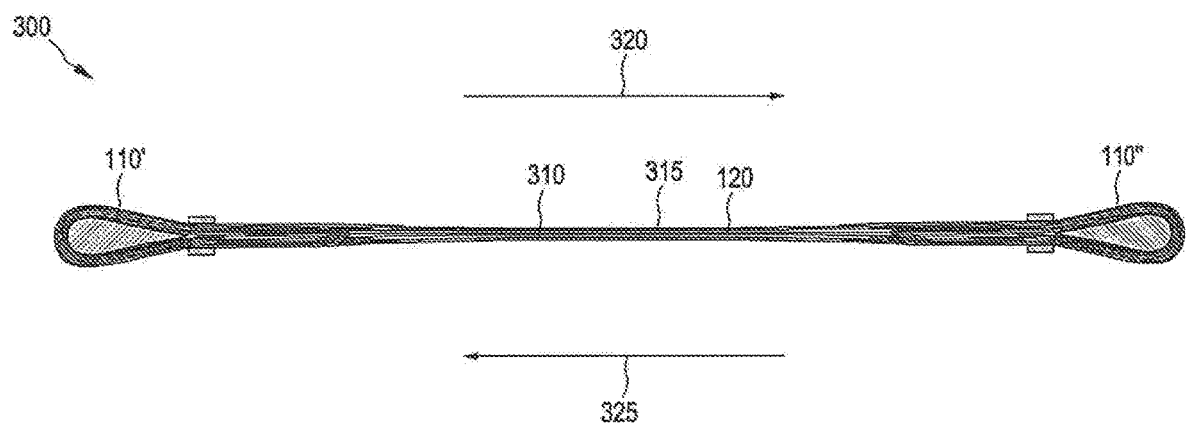
FIG. 3 a representation of an embodiment example of the tension member with a loop on each of the two ends of the tension member according to the first aspect of the invention.

FIG. 3 shows a representation of an embodiment example of the tension member 300 with one loop 110', 110" on each of the two ends of the straight extending shaft section 310, which has a coating 315.

Via the two loops 110', 110", tensile forces 320, 325 that are present along the carbon fibers 120 can be introduced into the tension member.

Several tension members 300 can form a support structure group or parts of a supporting structure.

Figure 4:
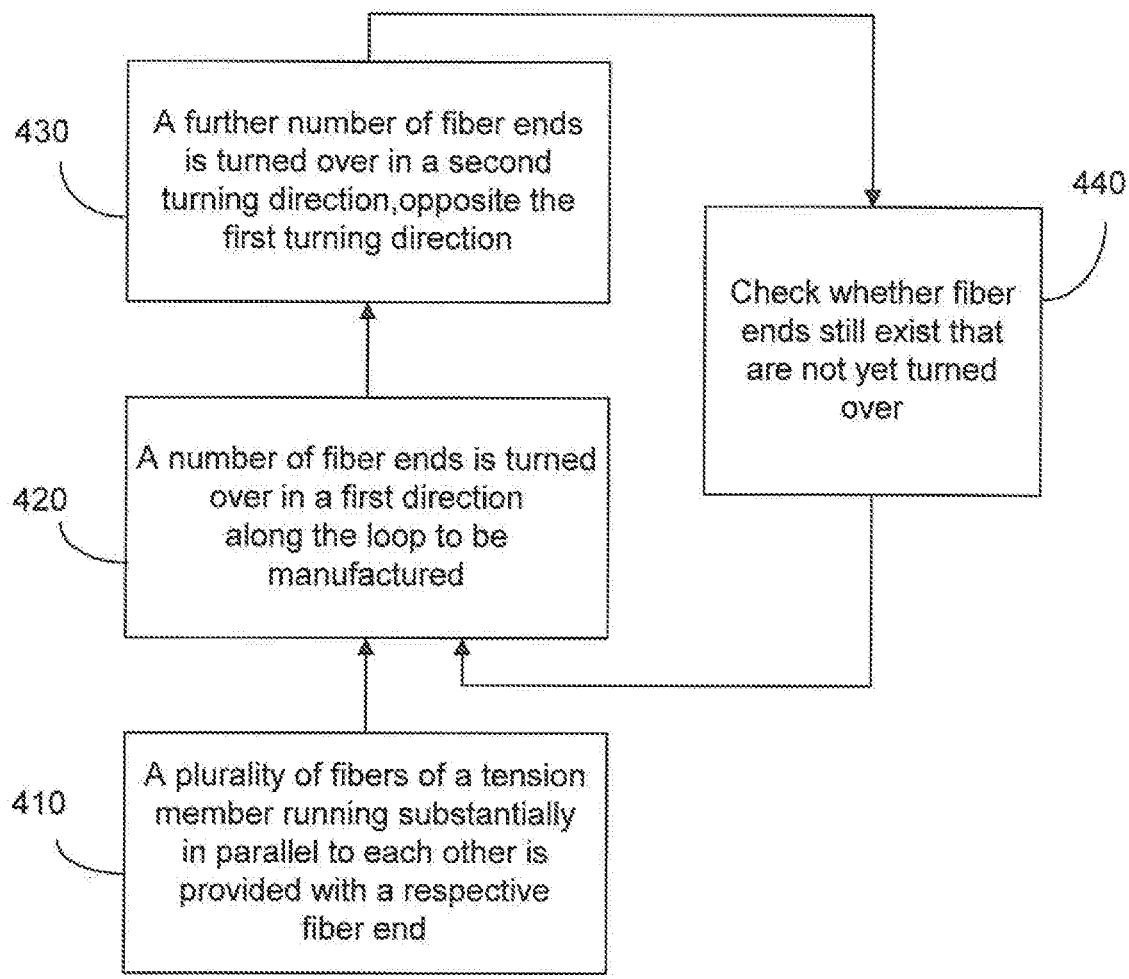
FIG. 4 a block diagram of an embodiment example of a method for manufacturing a tension member with a loop according to a third aspect of the invention.

FIG. 4 shows a block diagram of an embodiment example of a method for manufacturing a tension member from a fiber-reinforced plastic with a loop according to a third aspect of the invention.

The loop in this process is manufactured via a sequence of the following steps:

In a step 410, a plurality of fibers of a tension member running substantially in parallel to each other is provided with a respective fiber end.

In the next following steps 420, 430, the fiber ends are turned over. In step 420, a number of fiber ends is turned over in a first turning direction along the loop to be manufactured. During the next step 430, a further number of fiber ends is turned over in a second turning direction, opposite the first turning direction.

During the next step 440, a check of whether fiber ends still exist that are not yet turned over is performed. As long as fibers from the plurality of fibers still exist that are not yet turned over, the steps 420 and 430 are repeated. Turning over the fibers has to be performed such that some of the turned-over fibers end in a different distance from the vertex of the loop than others of the turned-over fibers, so that a cross-section of the tension member that results from the respective number of fibers that run approximately parallel to each other outside the turning-over area of the fibers approximately continuously decreases until it reaches the cross-section size of the tension member.

In an embodiment example that is not shown, this method is supplemented by a last step, in which the fiber ends in the area of the loop of the turned-over fibers are connected to the tension member by way of a firmly bonded or a frictionally fastened connection. Such a frictional connection can consist of a clamp or of an additional coating. A firmly bonded connection can be achieved by applying an adhesive, by pressing or by injecting a bonding material. Furthermore, different further mounting parts and attachments can be added.

Figure 5:
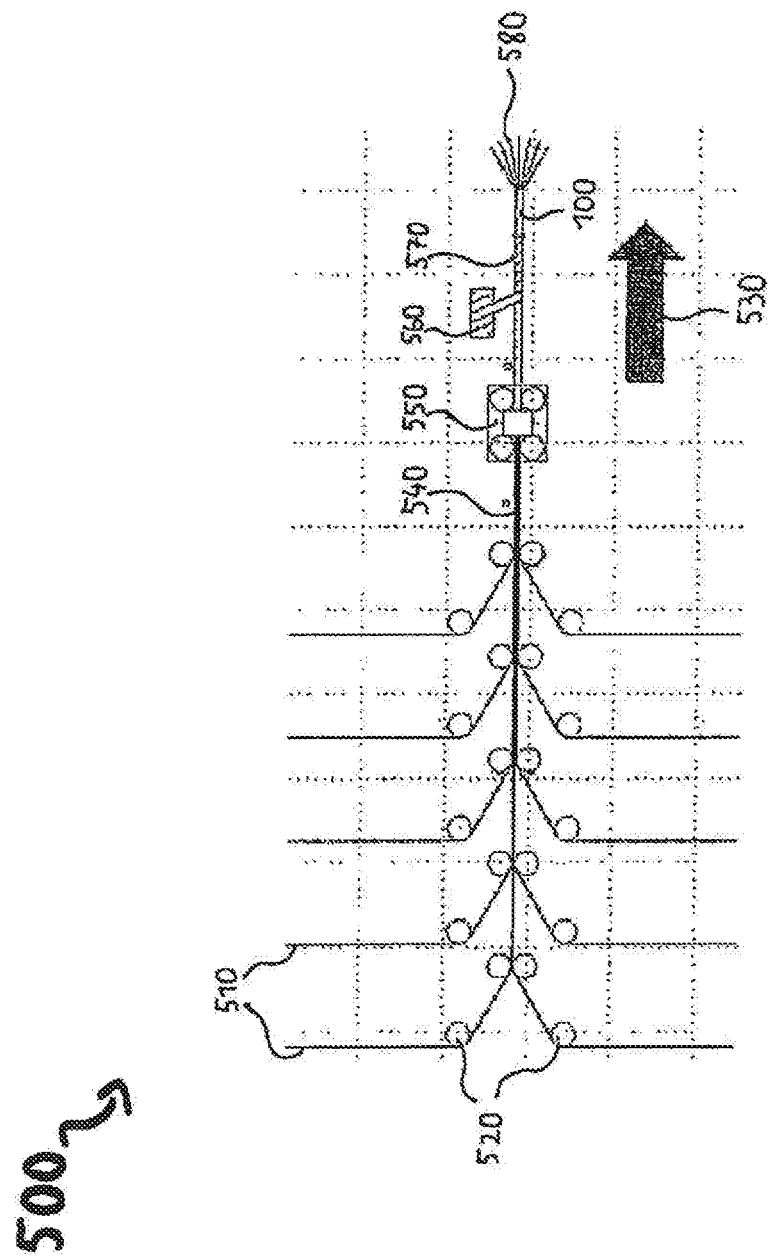
FIG. 5 a schematic illustration of a system for manufacturing a tension member according to an embodiment example of the method according to the third aspect of the invention.

FIG. 5 is a schematic illustration of a system 500 for manufacturing a tension member 100 according to an embodiment example of the method according to the third aspect of the invention.

In this embodiment example, the tension member is formed from carbon fibers, however, in corresponding embodiment examples that are not shown, also fibers can be used for the fiber-reinforced plastic according to the method that consist of glass, aramid, basalt or other technical or natural fibers for manufacturing the tension member. Alternatively, a mixture of different fibers, e.g. aramid fibers and carbon fibers, can also be provided.

Through the system 500, the individual carbon fibers and/or bar-shaped profiles made of carbon fiber reinforced plastic 510 are aligned into a mutual fiber direction 530 by guide rollers 520. This results in the provision of a plurality of carbon fibers 540 running substantially parallel to each other. In a bonding unit 550 of the system 500, the individual cords that are running parallel to each other are arranged and, where appropriate, embedded in a plastic matrix, thus being processed into a cross-section of carbon fiber reinforced plastic. Moreover, the system 500 is also provided with a coating unit 560, which is designed to apply a coating 570 onto an outer circumferential surface of the plurality of carbon fibers 540. If the carbon fibers already exist in the form of carbon profiles, they need not be connected with each other along the length.

For the manufacture of the tension member 100, the respective carbon fibers are pulled by the shown system 500 into the fiber direction 530, thus first forming a straight shaft section, prior to creating a loop by performing further manufacturing steps illustrated in FIG. 4. Alternatively, one or more loops can already be arranged at the plurality of carbon fibers that is joined at the ends, before the carbon fibers are brought together in the further course of the process. It is advantageous for the manufacture of the loop, if the ends of the individual cords 580 are not yet embedded in plastic and coated. Thus, leaving the fiber ends and profile ends 580 exposed, as also shown in FIG. 5, facilitates forming the loop within the framework of the further manufacturing steps.

The invention claimed is:

1. A tension member comprising:
a straight shaft section having a cross-section size and comprising a plurality of carbon fibers that run in parallel to each other, and
at least one loop made of carbon fiber-reinforced plastic, wherein the loop is formed from fiber ends of said plurality of carbon fibers of the straight shaft section by a first group of fiber ends turned over along the loop in a first turning direction with a second group of fiber ends turned over along the loop in a second turning direction, which is opposed to the first turning direction, and wherein some turned-over fiber ends of the first group of fiber ends end in a different distance from a vertex of the loop than other fiber ends of the first group of fiber ends and wherein some turned-over fiber ends of the second group of fiber ends end in a different distance from the vertex of the loop than other fiber ends of the second group of fiber ends, so that turned-over fiber ends of the first group of fiber ends, each end before a next turned-over fiber end of the first group of fiber ends, and so that turned-over fiber ends of the second group of fiber ends, each end before a next turned-over fiber end of the second group of fiber ends, and so that a cross-section of the tension member that results from a respective number of carbon fibers running approximately parallel to each other outside a turning-over area of the carbon fibers approximately continuously decreases until it reaches the cross-section size of the straight shaft section;
wherein the carbon fibers from the first group of fiber ends and the carbon fibers from the second group of fiber ends alternate respectively.

2. The tension member according to claim 1, wherein the first group of fiber ends comprises a number of fibers that differ by a maximum 20 percent from a number of fibers of the second group of fiber ends.

3. The tension member according to claim 1, wherein some fibers from the first group and some fibers of the second group are alternately turned over according to their respective turning direction, thereby forming the loop.

4. The tension member according to claim 1, wherein ends of the turned-over fiber ends of the first group of fiber ends and ends of the turned-over fiber ends of the second group of fiber ends are connected to the shaft section of the tension member via a firmly bonded connection.

5. The tension member according to claim 1, wherein the straight shaft section is a straight stretched shaft section that has a loop on at least one end.

6. The tension member according to claim 1, wherein the straight shaft section is a straight stretched shaft section, which has at least one loop on each of a first and a second end.

7. The tension member according to claim 1, wherein the straight shaft section is a straight stretched shaft section that on one side or on both sides divides into several cords and has a loop on each end.

8. A support structure, which comprises a plurality of tension members according to claim 1.

9. The tension member according to claim 1, wherein the plurality of fibers are carbon fibers and additionally comprise of glass fibers, aramid fibers, basalt fibers or natural fibers.

* * * * *